United States Patent [19]

Smierciak et al.

[11] Patent Number: 5,602,222
[45] Date of Patent: Feb. 11, 1997

[54] PROCESS FOR MAKING AN ACRYLONITRILE, METHACRYLONITRILE AND OLEFINICALLY UNSATURATED MONOMERS

[75] Inventors: Richard C. Smierciak, Aurora; Eddie Wardlow, Jr., Shaker Hts.; Lawrence E. Ball, Akron, all of Ohio

[73] Assignee: The Standard Oil Company, Cleveland, Ohio

[21] Appl. No.: 543,230

[22] Filed: Oct. 13, 1995

Related U.S. Application Data

[63] Continuation of Ser. No. 333,943, Nov. 3, 1994, abandoned, which is a continuation of Ser. No. 150,515, Nov. 10, 1993, abandoned.

[51] Int. Cl.$^6$ .................................................... C08F 220/44
[52] U.S. Cl. .................................................... 526/342
[58] Field of Search ........................................... 526/342

[56] References Cited

U.S. PATENT DOCUMENTS 2,692,875  10/1954  Weinstock, Jr. et al. ............... 526/242
3,565,876  2/1971  Ball et al. .
5,106,925  4/1992  Curatolo et al. .

Primary Examiner—Joseph L. Schofer
Assistant Examiner—N. Sarofim
Attorney, Agent, or Firm—David J. Untener; Michael F. Esposito; Teresan W. Gilbert

[57] ABSTRACT

A process for making a thermally stable melt processable acrylonitrile/methacrylonitrile/olefinically unsaturated multipolymer, comprising polymerizing a mixture of acrylonitrile monomer, methacrylonitrile monomer, and olefinically unsaturated monomer in which the rate of addition of the multimonomer mixture is set by the rate of polymerization so that the concentration of unreacted acrylonitrile monomer, unreacted methacrylonitrile monomer and unreacted olefinically unsaturated monomer is low and the polymerization process is in a monomer starved condition.

37 Claims, No Drawings

PROCESS FOR MAKING AN ACRYLONITRILE, METHACRYLONITRILE AND OLEFINICALLY UNSATURATED MONOMERS

This is a continuation of application Ser. No. 08/333,943 filed on Nov. 3, 1994 which is a file wrapper continuation of U.S. Ser. No. 08/150,515 filed on Nov. 10, 1993 both abandoned.

BACKGROUND OF THE INVENTION

Related Application

This patent application is related to patent application entitled "A PROCESS FOR MAKING AN ACRYLONITRILE/METHACRYLONITRILE COPOLYMER", U.S. Ser. No. 539,664 and filed the same date as this patent application.

Field of the Invention

The present invention relates to a process for producing a homogeneous acrylonitrile/methacrylonitrile multipolymer, with improved thermal stability, that is melt processable. More specifically, the invention relates to a monomer starved process for producing an acrylonitrile/methacrylonitrile/olefinically unsaturated multipolymer in which the polymerization rate exceeds or equals the addition rate of the multimonomers of acrylonitrile monomer, methacrylonitrile monomer, and olefinically unsaturated monomer.

Description of the Prior Art

Acrylic polymers are desirable to produce fibrous textiles, films, molded objects, packaging applications, and the like because the acrylic polymers have a high nitrile polymer content. Nitrile polymers have excellent physical, thermal, and mechanical properties such as barrier properties, chemical resistance, rigidity, heat resistance, UV resistance, moisture retention, and bacteria resistance. Acrylonitrile and methacrylonitrile monomers are nitrile monomers useful to produce acrylic polymers.

In the past, high nitrile polymers have been limited to containing about 20% by weight polymerized acrylonitrile since higher acrylonitrile content leads to non-melt processable polymers. U.S. Pat. No. 3,565,876 discloses that up to about 20% by weight of an acrylonitrile monomer can be copolymerized with a methacrylonitrile monomer to form an extrudable copolymer which can be readily oriented and possesses excellent physical properties. Increasing the acrylonitrile content above about 20% by weight in the acrylonitrile/methacrylonitrile copolymer results in a resin which is thermally unstable and not processable by any standard economical commercial melt processing techniques including extrusion.

High acrylic polymers are conventionally processed by solvent techniques such as wet spinning acrylic fibers. The use of solvents is disadvantageous because the solvents must be removed from the acrylic polymer prior to end use resulting in voids in the acrylic fiber. Furthermore, the solvents are typically toxic and their disposal has negative impact on the environment.

U.S. Pat. No. 5,106,925 discloses a process for producing an acrylonitrile/methacrylonitrile copolymer that is melt processable in the absence of solvent. The patent discloses that acrylonitrile/methacrylonitrile copolymer is produced under flooded monomer process conditions. In the flooded monomer process, the molar weight ratios of the acrylonitrile monomer and methacrylonitrile monomer must be carefully controlled and adjusted throughout the polymerization process in relationship to the conversion of the comonomers to copolymer. The copolymer conversion is tracked throughout the process so that the addition of comonomers may be adjusted to obtain the desired copolymer. Thus, this process is disadvantageous because of the necessity to track, to predict the copolymer conversion rate, and to adjust the rate of addition of the comonomers throughout the process.

It is advantageous to produce a homogeneous acrylonitrile/methacrylonitrile/olefinically unsaturated multipolymer with improved thermoplastic properties which multipolymers are melt processable in the absence of a solvent. Further, it is desirable to produce an acrylonitrile/methacrylonitrile/olefinically unsaturated multipolymer by a process in which the feed ratio of the monomers is fixed and constant throughout the polymerization process. It is advantageous to confer improved properties on an acrylonitrile/methacrylonitrile copolymer by the addition of an olefinically unsaturated polymerizable monomer into the acrylonitrile/methacrylonitrile copolymer. The addition of an olefinically unsaturated monomer to an acrylonitrile/methacrylonitrile copolymer improves properties such as thermal stability, strength, rheology, processability, colorability, moisture retention, flexibility, and the like.

SUMMARY OF THE INVENTION

The present invention provides a new and an improved process for producing an acrylonitrile/methacrylonitrile/olefinically unsaturated multipolymer with improved thermal stability, excellent mechanical, and excellent physical properties. The process comprises polymerizing a mixture of acrylonitrile monomer, methacrylonitrile monomer, and olefinically unsaturated monomer in which the rate of addition of the acrylonitrile monomer, the methacrylonitrile monomer, and the olefinically unsaturated monomer is set to be equal to or less than the rate of polymerization to maintain a monomer starved process. Further, the weight of unreacted acrylonitrile monomer, unreacted methacrylonitrile monomer, and unreacted olefinically unsaturated monomer is not greater than 15% of the weight of the polymerizing mixture. Further, the molar ratio of acrylonitrile monomer, methacrylonitrile monomer, and olefinically unsaturated monomer is fixed and constant for the multimonomer feed throughout the polymerization process.

In particular, the process for polymerizing an acrylonitrile monomer, a methacrylonitrile monomer, and an olefinically unsaturated monomer for producing acrylonitrile/methacrylonitrile/olefinically unsaturated multipolymer comprises the steps of;

1. heating an initial multimonomer mixture comprising acrylonitrile monomer and methacrylonitrile monomer under an inert atmosphere in the range of about 40° C. to about 120° C., 2. adding an initiator to the initial multimonomer mixture to start a polymerization reaction, and 3. adding a multimonomer feed mixture comprising an acrylonitrile monomer, a methacrylonitrile monomer and an olefinically unsaturated monomer to the polymerization mixture wherein the multimonomer feed mixture has a fixed and constant molar ratio of acrylonitrile monomer to methacrylonitrile monomer to olefinically unsaturated monomer and further wherein the addition rate of the multimonomer feed mixture is less than or equal to the polymerization rate.

The process of the present invention produces homogeneous acrylonitrile/methacrylonitrile/olefinically unsaturated multipolymers in which the units of acrylonitrile, methacrylonitrile, and olefinically unsaturated monomer are interdispersed randomly throughout the polymerized chain in relatively small monomer units resulting in a thermally stable melt processable multipolymer with improved characteristics. The acrylonitrile/methacrylonitrile/olefinically unsaturated multipolymer is melt processable in the absence of solvent or plasticizing agent to produce acrylic products.

DETAILED DESCRIPTION OF THE INVENTION

The present invention relates to a process for producing thermally stable melt processable homogeneous acrylonitrile/methacrylonitrile/olefinically unsaturated multipolymers.

The new and improved process for producing a thermally stable melt processable multipolymer of acrylonitrile, methacrylonitrile and olefinically unsaturated monomer is accomplished by controlling the rate of addition of the acrylonitrile monomer, methacrylonitrile monomer, and olefinically unsaturated monomer relative to the rate of polymerization. The process of the invention is a monomer starved process in which the polymerization reaction rate exceeds or equals the multimonomer mixture addition rate. The low concentration of the multimonomers during the addition step prevents long sequences of acrylonitrile monomer in the multipolymer. The multipolymer contains small sequences of methacrylonitrile and olefinically unsaturated monomer interdispersed between small sequences of acrylonitrile for example, AN-AN-X-MAN-AN-X-X-AN-MAN-MAN-X (X=olefinically unsaturated monomer), allowing for melt processability of the acrylonitrile/methacrylonitrile/olefinically unsaturated multipolymer in the absence of solvent. Additionally, employing the olefinically unsaturated monomer in the acrylonitrile/methacrylonitrile polymer backbone reduces the amount of repeating acrylonitrile sequences resulting in a more random multipolymer.

The rate of addition of the acrylonitrile monomer, methacrylonitrile monomer, and olefinically unsaturated monomer is incremental or continuous, preferably continuous, throughout the polymerization reaction. The molar ratio of the multimonomer feed mixture of acrylonitrile monomer, methacrylonitrile monomer, and olefinically unsaturated monomer is constant throughout the process. The process produces a homogeneous composition of the multipolymer similar to the molar ratio of the incoming multimonomer feed mixture.

The olefinically unsaturated monomer employed in the present invention is any olefinically unsaturated monomer with a C=C double bond polymerizable with an acrylonitrile monomer and/or a methacrylonitrile monomer. The olefincially unsaturated monomer employed in the multimonomer mixture can be a single polymerizable monomer resulting in a terpolymer or a combination of polymerizable monomers resulting in a multipolymer.

The olefinically unsaturated monomer generally includes but is not limited to acrylates, methacrylates, acrylamide and its derivatives, vinyl ethers, vinyl amides, vinyl ketones, styrenes, halogen containing monomers, ionic monomers, acid containing monomers, base containing monomers, olefins, and the like.

The acrylates include but are not limited to $C_1$ to $C_{12}$ alkyl, aryl and cyclic acrylates such as methyl acrylate, ethyl acrylate, phenyl acrylate, butyl acrylate, 2 ethyl hexyl acrylate and isobornyl acrylate and functional derivatives of the acrylates such as 2-hydroxy ethyl acrylate, 2-chloro ethyl acrylate, and the like. The preferred acrylates are methyl acrylate and ethyl acrylate.

The methacrylates include but are not limited to $C_1$ to $C_{12}$ alkyl, aryl and cyclic methacrylates such as methyl methacrylate, ethyl methacrylate, phenyl methacrylate butyl methacrylate 2-ethyl hexyl methacrylate and isobornyl methacrylate and functional derivatives of the methacrylates such as 2-hydroxy ethyl methacrylate, 2-chloro ethyl methacrylate, and the like. The preferred methacrylate is methyl methacrylate.

The acrylamides and their N-substituted alkyl and aryl derivatives include but are not limited to acrylamide, N-methyl acrylamide, N-dimethyl acrylamide and the like.

The vinyl esters include but are not limited to vinyl acetate, propionate, butyrate and the like. The preferred vinyl ester is vinyl acetate.

The vinyl ethers include but are not limited to $C_1$ to $C_8$ vinyl ethers such as ethyl vinyl ether, butyl vinyl ether and the like.

The vinyl amides include but are not limited to vinyl pyrrolidone and the like.

The vinyl ketones include but are not limited to $C_1$ to $C_8$ vinyl ketone such as ethyl vinyl ketone, butyl vinyl ketone and the like.

The styrenes include but are not limited to methylstyrene, styrene, indene, a styrene of the formula

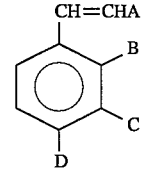

wherein each of A, B, C, and D is independently selected from hydrogen (H) and $C_1$ to $C_4$ alkyl group, substituted styrenes, multiply-substituted styrenes and the like.

The halogen containing monomers include but are not limited to vinyl chloride, vinyl bromide, vinyl fluoride, vinylidene chloride, vinylidene bromide, vinylidene fluoride, halogen substituted propylene monomers and the like. The preferred halogen containing monomers are vinyl bromide and vinylidene chloride.

The ionic monomers include but are not limited to sodium vinyl sulfonate, sodium styrene sulfonate, sodium methallyl sulfonate, sodium acrylate, sodium methacrylate and the like. The preferred ionic monomers are sodium vinyl sulfonate, sodium styrene sulfonate and sodium methallyl sulfonate.

The acid containing monomers include but are not limited to acrylic acid, methacrylic acid, vinyl sulfonic acid, itaconic acid and the like. The preferred acid containing monomers are itaconic acid and vinyl sulfonic acid.

The base containing monomers include but are not limited to vinyl pyridine, N-amino ethyl acrylamide, N-amino propyl acrylamide, N-amino ethyl acrylate, N-amino ethyl methacrylate and the like.

The olefins include but are not limited to isoprene, butadiene, $C_2$ to $C_8$ straight chained and branched alpha-olefins such as propylene, ethylene, isobutylene, diisobutylene, 1-butene and the like. The preferred olefins are isobutylene, ethylene and propylene.

The choice of olefinically unsaturated monomer or combination of monomers depends on the properties desired to impart to the resulting multipolymer and its end use. For instance, polymerizing monomers of acrylonitrile, methacrylonitrile, and styrene and/or indene results in a multipolymer and its end products with improved heat distortion temperature and glass transition temperature. Polymerizing monomers of acrylonitrile, methacrylonitrile, and isobutylene improves the flexibility of the multipolymer and its end products. Polymerizing monomers of acrylonitrile, methacrylonitrile, and acrylates and/or methacrylates improves the processability of the multipolymer and its end products. Polymerizing acid-containing monomers, base containing monomers and/or hydroxyl group containing monomers with an acrylonitrile monomer and a methacrylonitrile monomer enhances the colorability of the resulting multipolymer. Polymerizing monomers of acrylonitrile, methacrylonitrile, and a halogen containing monomer increases the flame resistance of the multipolymer and its end products.

In the practice of the present invention the polymerization process is carried out as an emulsion, a solution, a suspension or in bulk. Preferably, the polymerization process is carried out as an emulsion, or a suspension. The present invention can be practiced as a semicontinuous or continuous process.

Initially, acrylonitrile monomer, methacrylonitrile monomer, and olefinically unsaturated monomer is contacted in an aqueous medium at about 0.1% by weight to about 15% by weight of the total polymerization reaction media. The initial multimonomer mixture contains about 99% by weight to about 20% by weight acrylonitrile monomer, about 0.1% by weight to about 80% by weight methacrylonitrile monomer, and about 0% by weight to about 40% by weight olefinically unsaturated monomer. Preferably, the initial multimonomer mixture is richer in acrylonitrile monomer than the multimonomer feed mixture because the acrylontrile monomer is more soluble in the aqueous medium than is the methacrylonitrile monomer.

The aqueous medium contains water and a suitable surfactant such as an emulsifier or a dispersing agent. The surfactants and their uses are known to those skilled in the art.

A molecular weight modifier may be added to the initial multimonomer mixture in the range of about 0% by weight to about 5% by weight, preferably about 0.1% by weight to 4% by weight, and most preferably about 0.1% by weight to about 3% by weight of the total multimonomer mixture.

The initial multimonomer mixture is placed into a reaction container containing aqueous medium. The reaction container with the aqueous medium is purged with an inert gas, such as nitrogen, argon, and the like. Preferably, but optionally, the inert gas purge is continued throughout the polymerization reaction. The initial multimonomer mixture is then heated to a temperature in the range of about 40° C. to about 120° C., preferably about 50° C. to about 90° C. and most preferably about 65° C. to about 75° C. The temperature of the polymerization reaction is maintained throughout the process in the range of about 40° C. to about 120° C., preferably about 50° C. to about 90° C. and most preferably about 65° C. to about 75° C.

An initiator is added to the heated initial multimonomer mixture to start the polymerization reaction. The initiator is added to the reaction container generally as a single solution. The initiator is added generally in the range of about 0.01% by weight to about 5% by weight of the total multimonomer mixture.

Simultaneously, after, or preferably immediately after the polymerization reaction has been initiated, a multimonomer feed mixture of acrylonitrile monomer, methacrylonitrile monomer, and olefinically unsaturated monomer is incrementally or continuously added to the polymerization reaction in the reaction container. Preferably the multimonomer feed mixture is continuously added to the polymerization reaction. The combined weight of the unreacted acrylonitrile monomer, unreacted methacrylonitrile monomer, and unreacted olefinically unsaturated monomer present in the polymerizing mixture, at any time, is not greater than about 15% by weight, preferably not greater than about 10% by weight, and most preferably not greater than about 5% by weight of the polymerizing mixture.

The multimonomer feed mixture contains about 99% by weight to about 20% by weight acrylonitrile monomer, 0.1% by weight to about 80% by weight methacrylonitrile monomer, and 0.1% by weight to about 40% by weight olefinically unsaturated monomer. The molar ratio of the acrylonitrile monomer, the methacrylonitrile monomer, and the olefinically unsaturated monomer in the multimonomer feed mixture, is fixed and constant throughout the polymerization process resulting in a homogeneous multipolymer. The molar ratio of acrylonitrile monomer to methacrylonitrile monomer to olefinically unsaturated monomer depends on the desired acrylonitrile/methacrylonitrile/olefinically unsaturated multipolymer composition. The multipolymer composition is essentially the same as the composition of the multimonomer feed mixture.

A molecular weight modifier is optionally added to the polymerization mixture. Preferably, a molecular weight modifier is employed in the polymerization mixture. The molecular weight modifier is added continuously or incrementally to the polymerization mixture. Preferably, the molecular weight modifier is added continuously to the polymerization mixture typically by being added into the multimonomer feed mixture. The molecular weight modifier is preferably added to the polymerization reaction media in the range of about 0% by weight to about 5% by weight, preferably about 0.1% by weight to about 4% by weight, and most preferably about 0.1% by weight to about 3% by weight of the total multimonomer mixture.

The molecular weight modifier includes but is not limited to mercaptans, alcohols, halogen compounds, or any other chain transfer agent known to those skilled in the art. Mercaptans are the preferred molecular weight modifier and are generally a monomercaptan, multifunctional mercaptan or combinations thereof. The mercaptans include but are not limited to $C_5$ to $C_{18}$ alkyl mercaptans whether straight chained, branched, substituted or unsubstituted, d-limonene dimercaptan, dipentene dimercaptan, and the like. The preferred mercaptans are the $C_5$ to $C_{12}$ alkyl mercaptans whether straight chained, branched, substituted or unsubstituted, for example dodecyl mercaptan, and octyl mercaptan. The molecular weight modifier can be employed singularly or in combination. The molecular weight modifier can be the same or a different molecular weight modifier as is employed with the initial multimonomer mixture.

The molecular weight modifier controls the molecular weight of the polymerized acrylonitrile/methacrylonitrile/olefinically unsaturated polymer chain by terminating the growing chain. The molecular weight modifier useful in the present invention produces an acrylonitrile/methacrylonitrile/olefinically unsaturated multipolymer with a molecular weight in the range of about 15,000 molecular weight to about 500,000 molecular weight.

The initiator is added typically as a single solution, continuously or incrementally, to the polymerization mixture. Preferably, the initiator is added continuously. The initiator is added at a rate to maintain the polymerization rate, which rate can be determined by those skilled in the art. The concentration of the initiator is generally in the range of about 0% by weight to about 5% by weight of the total comonomer mixture.

The initiator is any free radical initiator known to those skilled in the art. The initiator includes but is not limited to azo compounds, peroxides, hydroperoxides, alkyl peroxides, peroxydicarbonates, peroxyesters, dialkyl peroxides, persulfates, perphosphates, and the like. Persulfates are the preferred initiators. The initiator can be employed singularly or in combination. The initiator can be the same or a different initiator as is employed to start the polymerization reaction.

The polymerization mixture is continuously or intermittently agitated by any known method, such as stirring, shaking, and the like. Preferably, the polymerization mixture is continuously agitated.

The reaction is continued until polymerization has proceeded to the desired extent, generally from about 40% to about 99% conversion, and preferably from about 70% to about 95% conversion.

The polymerization reaction is stopped by cooling, adding an inhibitor, such as diethyl hydroxylamine, 4-methoxylphenol, and the like, discontinuing the multimonomer feed mixture and the like. The inhibitors and their use are known to those skilled in the art.

It will be readily apparent to one skilled in the art that the acrylonitrile/methacrylonitrile/olefinically unsaturated multipolymer may be further modified by the addition of lubricants, dyes, leaching agents, plasticizers, pseudoplasticizers, pigments, delustering agents, stabilizers, static agents, antioxidants, reinforcing agents such as fillers, and the like. It is understood that any additive possessing the ability to function in such a manner can be used as long as it does not have a deleterious effect on the melt characteristics and thermal stability of the multipolymer.

At the conclusion of the polymerization reaction the acrylonitrile/methacrylonitrile/olefinically unsaturated multipolymer is isolated as a slurry, or a latex. Any known technique may be used to isolate the acrylonitrile/methacrylonitrile/olefinically unsaturated multipolymer such as crumb coagulation, spraying the solution of the multipolymer into a heated and/or evacuated chamber to remove the water vapors, stripping, filtration, centrifugation, and the like.

The acrylonitrile/methacrylonitrile/olefinically unsaturated multipolymer produced by the process of the instant invention is generally high nitrile multipolymers containing polymerized acrylonitrile monomer, methacrylonitrile monomer, and olefinically unsaturated monomer. The multipolymer comprises about 20% by weight to about 99% by weight polymerized acrylonitrile, about 0.1% by weight to about 80% by weight polymerized methacrylonitrile, and about 0.1% by weight to about 40% by weight polymerized olefinically unsaturated monomer.

The acrylonitrile/methacrylonitrile/olefinically unsaturated multipolymer is thermally stable and melt processable without the addition of any additives or stabilizers. The multipolymer of the present invention may be further processed by spinning, molding, extruding and the like without the use of solvents. The acrylonitrile/methacrylonitrile/olefinically unsaturated multipolymer possesses excellent thermal, physical, and mechanical properties and can be readily oriented. Further, the acrylonitrile/methacrylonitrile/olefinically unsaturated multipolymer may be utilized in numerous applications such as for use as fibers, sheets, films, pipes, tubings, molded articles, and the like.

SPECIFIC EMBODIMENTS

The following example demonstrates the process and advantages of the present invention.

Equipment

A 2 liter circulating hot water jacketed reactor was equipped with a reflux condenser, a thermocouple/controller, a paddle for agitation, which paddle was set at about 230 rpm, an argon purge tube (continuous), a monomer feed pump, and an initiator feed pump. Multimonomer feed mixture and ammonium persulfate initiator aqueous solution are metered, as separate single solutions, by Masterflex Microprocessor controlled feed pumps.

Component

The overall polymerization components for example 1 are as follows:

| Component | Grams (gm) |
| --- | --- |
| Water | 1260.0 |
| Rhofac RE-610 | 12.6 |
| Acrylonitrile | 228.9 |
| Methacrylonitrile | 153.3 |
| Methyl Acrylate | 37.8 |
| N-octyl mercaptan | 8.4 |
| Ammonium Persulfate | 2.646 |
| Total: | 1703.65 |

Procedure:

The reactor was pre-charged with about 1260 gm of water and about 12.6 gm of Rhofac RE-610 surfactant, made by Rhône Poulenc, which had been pre-dissolved at about 50° C. with stirring at about 200 rpm. The reactor was heated to about 70° C. with continuous argon purging. The initial multimonomer mixture contained about 2.1 gm of n-octyl mercaptan, 39.9 gm of acrylonitrile and 2.1 gm of methacrylonitrile was added to the reactor. About 0.882 gm of ammonium persulfate initiator was added to the reactor to initiate the polymerization reaction.

The multimonomer feed mixture containing about 6.3 gm of the n-octyl mercaptan was continuously pumped into the reactor at a constant, fixed 50/40/10 weight ratio of acrylonitrile monomer to methacrylonitrile monomer to methyl acrylate monomer. Simultaneously, about 1.764 gm of the ammonium persulfate initiator was pumped into the reactor as a 100 ml total volume aqueous solution. Both the multimonomer feed mixture stream and the initiator stream were fed into the reactor as separate streams. Total polymerization reaction time was about 6 hours.

After the polymerization reaction was completed the resulting multipolymer emulsion was filtered through a piece of pre-weighed cheesecloth to collect and separate any coagulum from multipolymer. The coagulum is bundled in a cheesecloth and rinsed with warm tap water. The cheesecloth is dried overnight at about 60° C. Then the dried cheesecloth/coagulum is weighed. The coagulum was about 0.1% by weight multimonomers.

About 2500 gm of distilled water containing about 14.8 gm of aluminum sulfate was heated to about 75° C. in a stainless steel beaker with continuous stirring. The filtered multipolymer emulsion was poured into the hot aluminum sulfate solution while stirring to coagulate the multipolymer as crumb. The multipolymer crumb was separated by hot filtration and then washed with about 2 to about 3 liters of distilled water. The washed multipolymer crumb was dried overnight on a filter. The multipolymer crumb was then washed by stirring in about 2 to about 3 liters of absolute methanol and soaked overnight. The slurry of multipolymer crumb was then filtered, and dried for about 3 to about 24 hours on a funnel. The multipolymer was then dried in a fluidized bed dryer at about 55° C. for about 3 hours.

The polymerization reaction resulted in a multipolymer composition for example 1 of about 50.4% by weight acrylonitrile, about 42.3% by weight methacrylonitrile, and about 7.3% by weight methyl acrylate.

EXAMPLE 2

The same procedure was followed as above for example 1 except the mixture of components was a weight ratio of 52/43/5 of acrylonitrile to methacrylonitrile to methyl acrylate,

EXAMPLE 3

The same procedure was followed as above for example 1 except the mixture of components was a weight ratio of 63/27/10 of acrylonitrile to methacrylonitrile to methyl acrylate,

COMPARATIVE EXAMPLE A

The same procedure was followed as above for example 1 except the mixture of components was different in that the monomer feed did not contain the olefinically unsaturated monomer of methyl acrylate, The copolymerization reaction resulted in a copolymer composition of about 53.1% by weight acrylonitrile and about 46.9% by weight methacrylonitrile,

TESTING

Molecular Weight:

The molecular weight (MW) of a polymer was determined by Gel Permeation Chromatography (GPC) in dimethyl formamide solvent and calibrated with polystyrene standards. This is a known standard method.

NMR Analysis:

Samples for NMR Analysis were prepared using DMSO-D6 as solvent. Compositions were determined using $^1$H spectra and sequence distributions were determined using $^{13}$C spectra. $^1$H spectra were obtained using a Varian Gemini 300 Spectrometer at 300 MHz and/or a Varian VXR-400 Spectrometer at 400 MHz. $^{13}$C spectra were obtained using a Varian Gemini 300 Spectrometer at 75.5 MHz and/or a Varian VXR-400 Spectrometer at 100.7 MHz. The numerical data is presented in Table I.

Brabender Plasticorder:

The Brabender plasticorder, available from C. W. Brabender Instruments Inc., South Hackensack, N.J., is a low shear melt mixing device that measures the torque (metergrams, m-g) required to melt stir a molten polymer. The test determines whether a polymer may be melted and processed employing standard thermoplastic equipment. The Brabender analyses were run at about 200° C. with torque readings taken at about 5 minute intervals to about 30 minutes. This method measures polymer degradation as a function of time, temperature, and physical abrading. The numerical data is presented in Table II.

Results:

A very uniform and homogeneous acrylonitrile/methacrylonitrile/methyl acrylate terpolymer was produced by the process described herein. The final conversion to multipolymer was about 90% based on total multimonomers.

The weight average molecular weight of the multipolymer examples 1, 2 and 3 were in the range of about 42,000 to about 48,000. Polydispersity, or ratio between weight average molecular weight to number average molecular weight was about 2.0.

The desired multipolymer composition of example 1 was 50/40/10 acrylonitrile/methacrylonitrile/methyl acrylate by weight. NMR data demonstrated that the sequencing in the example 1 multipolymer of the acrylonitrile monomer (AN), methacrylonitrile monomer (MAN) and methyl acrylate monomer (MA) was interdispersed and had a high degree of randomness as shown in Table I.

TABLE I

| | Composition | | | Sequencing (%)* | | | | | |
|---|---|---|---|---|---|---|---|---|---|
| Example | AN | MAN | MA | MMM | MMA | AMA | MAM | MAA | AAA |
| 1 | 50.4 | 42.3 | 7.4 | 15.2 | 44.8 | 39.9 | 18.5 | 50.0 | 31.6 |

*A = acrylonitrile, M = methacylonitrile
Methyl acrylate was not measured because the technique is not sensitive to the methyl acrylate.

The Brabender torque data for examples 1, 2 and 3 was in the range of about 564 m-g to about 900 m-g and for comparative example A was 940 m-g to 1920 m-g. This demonstrates that the multipolymer is more easily melt processed than the comparative example A. The Brabender torque data is shown in Tables II and III below:

TABLE II

| SAMPLE | AN/MAN/MA COMP | MOL WT | BB TORQUE (30 Min) | Tg (°C.) |
|---|---|---|---|---|
| EXAMPLE | | | | |
| 1 | 50/40/10 | 42,000 | 564 | 92 |
| 2 | 252/43/5 | 48,000 | 900 | 96 |
| 3 | 63/27/10 | 46,000 | 744 | 90 |
| Comparative | | | | |
| A | 54/46/0 | 49,000 | 1,920 | 98 |

The above table demonstrates the use of a termonomer decreases viscosity and the multipolymer is more easily processed.

TABLE III

BRABENDER TORQUE

| EXAMPLE | SAMPLE | M WT | TORQUE 10 min | TORQUE 20 min | TORQUE 30 min |
| --- | --- | --- | --- | --- | --- |
| 2 | AN/MAN/MA | 48,000 | 763 | 829 | 900 |
| A | Comparative AN/MAN | 49,000 | 940 | 1,427 | 1,920 |

The above table demonstrates the improved melt stability of the multipolymer compared to the comparative copolymer at a similar molecular weight.

From the above descriptions of the invention, those skilled in the art will perceive improvements, changes and modifications in the invention. Such improvements, changes and modifications within the skill of the art are intended to be covered by the appended claims.

What is claimed:

1. A process for polymerizing an acrylonitrile monomer, a methacrylonitrile monomer, and an olefinically unsaturated monomer to make an acrylonitrile/methacrylonitrile/olefinically unsaturated multipolymer, said process comprising the steps of:

heating an initial multimonomer mixture comprising acrylonitrile monomer, methacrylonitrile monomer and olefinically unsaturated monomer under an inert atmosphere in the range of about 40° C. to about 120° C.;

adding an initiator to an initial multimonomer mixture to start a polymerization reaction;

adding a multimonomer feed mixture comprising acrylonitrile monomer, methacrylonitrile monomer and olefinically unsaturated monomer to a polymerization mixture wherein the multimonomer feed mixture is added at a fixed and constant molar ratio of acrylonitrile monomer to methacrylonitrile monomer to olefinically unsaturated monomer and at a constant rate which is less than the rate at which the monomers are converted into multipolymer.

2. The process of claim 1 wherein a molecular weight modifier is added to the initial multimonomer mixture, to the multimonomer feed mixture or to both mixtures.

3. The process of claim 2 wherein the molecular weight modifier is added to the initial multimonomer mixture in the range of about 0% by weight to about 5% by weight of total multimonomer mixture.

4. The process of claim 2 wherein the molecular weight modifier is added to the multimonomer feed mixture in the range of about 0% by weight to about 5% by weight of total multimonomer mixture.

5. The process of claim 2 wherein the molecular weight modifier is selected from the group consisting of mercaptans, alcohols, halogen compounds and combinations thereof.

6. The process of claim 5 wherein the molecular weight modifier is a mono-mercaptan, a multifunctional mercaptan or combinations thereof and further wherein the mercaptan is selected from the group consisting of $C_5$ to $C_{18}$ alkyl mercaptans which are straight chained, branched, substituted, unsubstituted and combinations thereof.

7. The process of claim 6 wherein the alkyl mercaptan has from 5 to 12 carbon atoms.

8. The process of claim 5 wherein the mercaptan is selected from the group consisting of dodecyl mercaptan, octyl mercaptan and combinations thereof.

9. The process of claim 1 wherein the initial multimonomer mixture is heated from about 65° C. to about 75° C.

10. The process of claim 1 wherein the initiator is added to the initial multimonomer mixture in the range of 0.01% by weight to about 5% by weight of total multimonomer mixture.

11. The process of claim 10 wherein the initiator is selected from the group consisting of azo compounds, peroxides, hydroperoxides, alkyl peroxides, peroxydicarbonates, peroxyesters, dialkyl peroxides, persulfates, perphosphates and combinations thereof.

12. The process of claim 1 further comprising the step of adding an initiator continuously to the polymerization reaction media.

13. The process of claim 12 wherein the initiator is added to the polymerization reaction media at about 0.01% by weight to about 5% by weight of total multimonomer mixture and is further selected from the group consisting of azo compounds, peroxides, hydroperoxides, alkyl peroxides, peroxydicarbonates, peroxyesters, dialkyl peroxides, persulfates, perphosphates, and combinations thereof.

14. The process of claim 1 wherein the initial multimonomer mixture contains about 99% by weight to about 20% by weight acrylonitrile monomer, about 0.1% by weight to about 80% by weight methacrylonitrile monomer and about 0% by weight to about 40% by weight olefinically unsaturated monomer.

15. The process of claim 1 wherein the multimonomer feed mixture contains about 99% by weight to about 20% by weight acrylonitrile monomer, about 0.1% by weight to about 80% by weight methacrylonitrile monomer and about 0.1% by weight to about 40% by weight olefinically unsaturated monomer.

16. The process of claim 1 wherein the combined weight of unreacted acrylonitrile monomer, unreacted methacrylonitrile monomer and unreacted olefinically unsaturated monomer present in the polymerizing mixture, at any time, is not greater than about 10% by weight of the polymerizing mixture.

17. The process of claim 1 wherein the combined weight of unreacted acrylonitrile monomer, unreacted methacrylonitrile monomer and unreacted olefinically unsaturated monomer present in the polymerizing mixture, at any time, is not greater than about 5% by weight of the polymerizing mixture.

18. The process of claim 1 wherein said process is carried out as an emulsion, a solution, a suspension or in bulk.

19. The process of claim 1 wherein the olefinically unsaturated monomer is selected from the group consisting of acrylates, methacrylates, acrylamides, acrylamide derivatives, vinyl esters, vinyl ethers, vinylamides, vinyl ketones, styrenes, halogen containing monomers, ionic monomers, acid containing monomers, base containing monomers, olefins and combinations thereof.

20. The process of claim 19 wherein the acrylates are selected from the group consisting of $C_1$ to $C_{12}$ alkyl, aryl and cyclic acrylates, their functional derivatives, and combinations thereof.

21. The process of claim 19 wherein the acrylates are selected from the group consisting of methyl acrylate, ethyl acrylate, phenyl acrylate, butyl acrylate, isobornyl acrylate, 2-hydroxy ethyl acrylate, 2-chloro ethyl acrylate, 2-ethyl hexyl acrylate and combinations thereof.

22. The process of claim 19 wherein the methacrylate is selected from the group consisting of $C_1$ to $C_{12}$ alkyl, aryl and cyclic methacrylates, their functional derivatives and combinations thereof.

23. The process of claim 22 wherein the methacrylates are selected from the group consisting of methyl methacrylate, ethyl methacrylate, phenyl methacrylate, butyl methacrylate, isobornyl methacrylate, 2-hydroxy ethyl methacrylate, 2-chloro ethyl methacrylate, 2-ethyl hexyl methacrylate and combinations thereof.

24. The process of claim 19 wherein the acrylamides are selected from the group consisting of acrylamide, N-substituted alkyl and aryl derivatives, N-methyl acrylamide, N-dimethyl acrylamide and combinations thereof.

25. The process of claim 19 wherein the vinyl esters are selected from the group consisting of vinyl acetate, propionate, butyrate and combinations thereof.

26. The process of claim 19 wherein the vinyl ethers are a $C_1$ to $C_8$ vinyl ethers and further selected from the group consisting of ethyl vinyl ether, butyl vinyl ether and combinations thereof.

27. The process of claim 19 wherein the vinyl amides are selected from the group consisting of vinyl pyrrolidone and combinations thereof.

28. The process of claim 19 wherein the vinyl ketones are $C_1$ to $C_8$ vinyl ketones and further selected from the group consisting of ethyl vinyl ketone, butyl vinyl ketone and combinations thereof.

29. The process of claim 19 wherein the styrenes are selected from the group consisting of methylstyrene, styrene, indene, a styrene of the formula

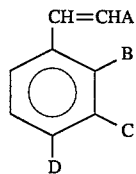

wherein each of A, B, C, and D is independently selected from hydrogen (H) and $C_1$ to $C_4$ alkyl group, substituted styrenes, multiply-substituted styrenes and combinations thereof.

30. The process of claim 19 wherein the halogen containing monomers are selected from the group consisting of vinyl chloride, vinyl bromide, vinyl fluoride, vinylidene chloride, vinylidene bromide, vinylidene fluoride, halogen substituted propylene monomers and combinations thereof.

31. The process of claim 19 wherein the ionic monomers are selected from the group consisting of sodium vinyl sulfonate, sodium styrene sulfonate, sodium methallyl sulfonate, sodium acrylate, sodium methacrylate and combinations thereof.

32. The process of claim 19 wherein the acid containing monomers are selected from the group consisting of acrylic acid, methacrylic acid, vinyl sulfonic acid, itaconic acid and combinations thereof.

33. The process of claim 19 wherein the base containing monomers are selected from the group consisting of vinyl pyridine, N-amino ethyl acrylamide, N-amino propyl acrylamide, N-amino ethyl acrylate, N-amino ethyl methacrylate and combinations thereof.

34. The process of claim 19 wherein the olefins are selected from the group consisting of isoprene, butadiene, $C_2$ to $C_8$ straight chained and branched alpha-olefins, and further wherein the $C_2$ to $C_8$ straight chained and branched alpha-olefins are selected from the group consisting of propylene, ethylene, isobutylene, diisobutylene, 1-butene and combinations thereof.

35. The acrylonitrile/methacrylonitrile/olefinically unsaturated multipolymer produced by the process of claim 1 wherein said multipolymer is about 20% by weight to about 99% by weight polymerized acrylonitrile monomer, about 0.1% by weight to about 80% by weight polymerized methacrylonitrile monomer and 0.1% by weight to about 40% by weight polymerized olefinically unsaturated monomer and wherein said multipolymer is thermally stable and melt processable without the use of solvents.

36. A process for making an acrylonitrile/methacrylonitrile/olefinically unsaturated multipolymer by polymerizing an acrylonitrile monomer, a methacrylonitrile monomer, and an olefinically unsaturated monomer to, said process comprising the steps of:

heating an initial multimonomer mixture comprising acrylonitrile monomer, methacrylonitrile monomer and olefinically unsaturated monomer under an inert atmosphere in the range of about 40° C. to about 120° C.;

adding an initiator to a initial multimonomer mixture to start a polymerization reaction;

adding a multimonomer feed mixture comprising acrylonitrile monomer, methacrylonitrile monomer and olefinically unsaturated monomer to a polymerization mixture wherein the multimonomer feed mixture has a fixed and constant molar ratio of acrylonitrile monomer to methacrylonitrile monomer to olefinically unsaturated monomer and is added at a rate of addition which is less than or equal to the rate of polymerization and wherein the unreacted monomers of acrylonitrile, methacrylonitrile and olefinically unsaturated monomer in the polymerization mixture are not greater than 10% of the total weight of the polymerization mixture resulting in homogeneous acrylonitrile/methacrylonitrile/olefinically unsaturated multipolymer product wherein the multipolymer product ratio is similar to the multimonomer feed ratio and wherein the multimonomer product is melt processable without the use of solvents.

37. A process for making an acrylonitrile/methacrylonitrile/olefinically unsaturated multipolymer polymerizing an acrylonitrile monomer, a methacrylonitrile monomer, and an olefinically unsaturated monomer to said process comprising the steps of:

heating an initial multimonomer mixture comprising acrylonitrile monomer, methacrylonitrile monomer and olefinically unsaturated monomer under an inert atmosphere in the range of about 40° C. to about 120° C.;

adding an initiator to a initial multimonomer mixture to start a polymerization reaction;

adding a multimonomer feed mixture comprising acrylonitrile monomer, methacrylonitrile monomer and olefinically unsaturated monomer to a polymerization mixture wherein the olefinically unsaturated monomer is selected from the group consisting of acrylates, methacrylates, acrylamides, acrylamide derivatives, vinyl esters, vinyl ethers, vinylamides, vinyl ketones, styrenes, halogen containing monomers, ionic monomers, acid containing monomers, base containing monomers, olefins and combinations thereof;

wherein the multimonomer feed mixture has a fixed and constant molar ratio of acrylonitrile monomer to methacrylonitrile monomer to olefinically unsaturated monomer and is added at a rate of addition which is less than or equal to the rate of polymerization; and wherein the unreacted monomers of acrylonitrile, methacrylonitrile and olefinically unsaturated monomer in the polymerization mixture are not greater than 15% of the total weight of the polymerization mixture;

resulting in homogeneous acrylonitrile/methacrylonitrile/ olefinically unsaturated multipolymer product wherein the multipolymer product ratio is similar to the multimonomer feed ratio and wherein the multimonomer product is melt processable without the use of solvents.

\* \* \* \* \*